United States Patent [19]
Terauchi et al.

[11] Patent Number: 4,758,444
[45] Date of Patent: Jul. 19, 1988

[54] PROCESS FOR THE PROCESSING OF CACAO BEANS

[75] Inventors: Masakazu Terauchi, Tokyo; Gentarou Suzuki, Kanagawa, both of Japan

[73] Assignee: Meiji Seika Kaisha, Ltd., Tokyo, Japan

[21] Appl. No.: 818,918

[22] Filed: Jan. 15, 1986

Related U.S. Application Data

[63] Continuation of Ser. No. 589,833, Mar. 15, 1984, abandoned.

[30] Foreign Application Priority Data

Mar. 15, 1983 [JP] Japan ................................. 58-41561

[51] Int. Cl.$^4$ ............................................. A23L 1/212
[52] U.S. Cl. ..................................... 426/593; 426/631
[58] Field of Search ............... 426/593, 417, 270, 262, 426/431, 631

[56] References Cited

U.S. PATENT DOCUMENTS

| | | | |
|---|---|---|---|
| 2,348,837 | 5/1944 | Nyrop | 426/417 |
| 2,745,746 | 5/1956 | Jones | 426/593 |
| 2,835,585 | 5/1958 | Rusoff | 426/431 |
| 2,954,293 | 9/1960 | Rusoff | 426/417 |
| 2,957,769 | 10/1960 | Rusoff | 426/593 |
| 3,119,693 | 1/1964 | Colten | 426/593 |

Primary Examiner—Raymond N. Jones
Assistant Examiner—Carolyn Paden
Attorney, Agent, or Firm—Sughrue, Mion, Zinn, Macpeak, and Seas

[57] ABSTRACT

A process for producing cocoa powder is disclosed wherein alkali treated cacao mass or cocoa powder is mixed with hot water maintained at 70° to 130° C. to dissolve a water-soluble portion of the cacao beans in hot water. Alternately the cacao mass or cocoa powder is mixed with hot water containing an alkali and maintained at 70° to 130° C. to dissolve the water-soluble portion in hot water and simultaneously to treat the cacao mass or cocoa powder with the alkali. The water-soluble portion/fine particle portion mixture is isolated and dried to produce a cocoa powder.

7 Claims, 1 Drawing Sheet

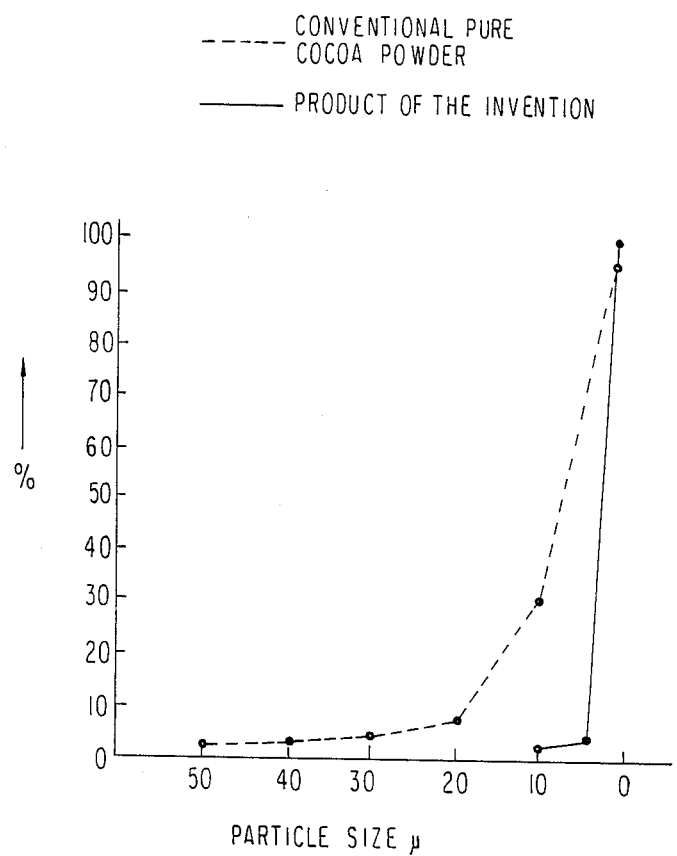

PROCESS FOR THE PROCESSING OF CACAO BEANS

This is a continuation of application Ser. No. 589,833, filed Mar. 15, 1984, now abandoned.

FIELD OF THE INVENTION

The present invention relates to a process for the processing of cacao beans. More particularly, the invention is concerned with a process for obtaining a mixture of a water-soluble portion and a fine particle portion from cacao mass or cocoa powder and also with a process for preparing cacao butter from the cacao mass or cocoa powder.

BACKGROUND OF THE INVENTION

Alkali-treated cocoa powder has heretofore been prepared by soaking cacao beans, cacao nibs, cacao mass, cacao flakes or cocoa powder in an alkali solution containing alkalis such as carbonates, hydrogencarbonates, and hydroxides of ammonia, magnesium, sodium, and potassium, drying the above-treated material, and then grinding it. In the case of cacao nibs and cacao beans, they are ground to yield cacao mass and, thereafter, the cacao mass is squeezed and ground to yield cocoa powder. The thus-produced cocoa powder, however, contains about 5 to 20% by weight of coarse particles having a particle size of $25\mu$ or more even if ground using a high-speed hammer mill and, therefore, when drunk as a cocoa drink, an undesirable "sandy" taste and feel results. This means that the cocoa powder contains a large amount of coarse particles insoluble in water or hot water.

Cacao butter made by squeezing cacao beans, cacao nibs, and cacao mass which have been subjected to an alkali treatment as described above has an "alkali" odor and cannot be utilized at all as an oil to be added in the production of chocolate unless it is subjected to a treatment to remove the odor.

Japanese Patent Application (OPI) No. 54957/76 (the term "OPI" as used herein refers to a "published unexamined Japanese patent application") discloses a method of producing a chocolate drink in which cacao nibs produced by the usual method are crushed and finely ground without application of an alkali treatment to produce cacao mass, water is added to the cacao mass in an amount of from 5 to 10 times by weight, the resulting mixture is heated to extract an effective components, solids are removed from the mixture, and the thus-obtained aqueous solution serves as a chocolate drink. This method, however, has various disadvantages. For example, since an alkali treatment is not employed in this method, the color of the solution is pale; a light brown color which is characteristic of a cocoa drink is not achieved. Furthermore, it has a strong acid taste and good flavor characteristic of cocoa does not arise. In general, tasteful substances originally insoluble in water are rendered water-soluble by use of an alkali treatment. That is, in accordance with this method, the flavorful substances are not rendered soluble in water because an alkali treatment is not employed. Thus, the amount of the extract is small and the yield is low. Furthermore, the cell walls of the cacao mass are not broken since the mass is not subjected to an alkali treatment. Thus, a large quantity of energy is needed in squeezing the cacao butter.

In addition, the following two methods are generally used to squeeze cacao butter. One method is to squeeze cacao nibs, which have not been subjected to an alkali treatment, using an expeller, and the other method is to squeeze cacao mass, which has been alkali-treated, using a cocoa press. In both of the methods, however, it is not possible to squeeze out all the oil present in the cacao mass. Usually about 10% by weight of cacao butter remains in the cacao mass. Cacao butter obtained from the alkali-treated cacao mass has a strong unpleasant odor and therefore cannot be added to chocolate products unless a deodorizing treatment is applied.

It is also known that cacao butter can be obtained by extraction with a solvent, such as hexane. In this method, however, a process to separate the cacao butter from the solvent after the extraction inevitably becomes complicated. Another disadvantage is that the extraction using hot water of cacao butter from the cacao mass, which has not been subjected to an alkali treatment, results in a low yield.

SUMMARY OF THE INVENTION

As a result of extensive investigations, a method for the processing of cacao beans has been developed which permits cocoa powder, free of the undesired powdery taste and feel that conventional cocoa powder has and having a strong taste and flavor to be produced, and also a method for the processing of cacao beans has been completed which enables cocoa powder, which does not have an alkali odor, to be produced with high efficiency.

The present invention provides:

in a first embodiment, a process for processing cacao beans which comprises:

(1) uniformly mixing cacao mass or cocoa powder, the cacao mass having been treated with an alkali, and the cocoa powder being obtained by partially squeezing said cacao mass, with hot water, in the presence or absence of ethanol, maintained at a temperature of from about 70° to 130° C. to dissolve the water-soluble portion thereof in hot water; and (2) separating a mixture of the water-soluble portion thereof and a fine particle portion thereof from the mixture of step (1);

in a second embodiment, a process for processing cacao beans which comprises:

(1) uniformly mixing cacao mass with hot water containing an alkali, and further, in the presence or absence of ethanol and at a temperature of from about 70° to 130° C. to dissolve the water-soluble portion thereof in hot water and simultaneously treating the mixture with alkali; and (2) separating a mixture of the water-soluble portion thereof and a fine particle portion thereof from the mixture of step (1);

in a third embodiment, a process for processing cacao beans which comprises:

(1) uniformly mixing cacao mass or cocoa powder, the cacao mass having been treated with an alkali, and the cocoa powder being obtained by partially squeezing the cacao mass, with hot water, in the presence or absence of ethanol, at a temperature of from about 70° to 130° C. to dissolve the water-soluble portion thereof in hot water; and (2) separating cacao butter from the mixture of step (1); and in a fourth embodiment, a process for processing cacao beans which comprises:

(1) uniformly mixing cacao mass with hot water containing an alkali, and further, in the presence or absence of ethanol, at a temperature of from about 70° to about 130° C. to dissolve the water-soluble portion thereof in hot water and simultaneously treating with an alkali; and (2) separating cacao butter from the mixture of step (1).

BRIEF DESCRIPTION OF THE DRAWING

The FIGURE is a graph showing the cumulative particle size distributions of the finished product obtained in Example 1 and a conventional pure cocoa powder.

DETAILED DESCRIPTION OF THE INVENTION

The alkali-treated cacao mass as used herein is prepared as follows:

Cacao beans or cacao nibs are roasted, soaked in an aqueous solution of an alkali, such as a carbonate, a hydrogencarbonate, or a hydroxide of ammonia, magnesium, sodium, or potassium, dried, and then ground. Alternatively, cacao beans or cacao nibs which are not roasted are soaked in an aqueous solution of an alkali as described above, and thereafter, roasted and ground.

The cocoa powder as used herein is prepared by partially squeezing the above-described ground cacao mass and then powdering.

The cacao mass and cocoa powder, which have been subjected to the above-described alkali treatment, both have a pH ranging between about 6.0 and 8.5. Cocoa drinks prepared using cacao mass or cocoa powder with a pH falling outside this range are not delicious.

Hot water maintained at a temperature of from about 70° to about 130° C. is then added to the cacao mass or cocoa powder in an amount of from 3 to 10 times by weight to the weight of the cacao mass or cocoa powder. The mixture is stirred to transfer the water-soluble portion and the fine particle portion from the cacao mass or cocoa powder to hot water. If the temperature of hot water is lower than about 70° C., the amount of the mixture of the water-soluble portion and the fine particles extracted from the cacao mass or cocoa powder decreases. On the other hand, if the temperature is in excess of about 130° C., aromatic components present in the cacao mass or cocoa powder dissipate along with steam and the ultimate products prepared using such aromatic component-free cacao mass or cocoa powder are not delicious.

If the amount of hot water added to the cacao mass or cocoa powder is less than about 3 times the weight of the cacao mass or cocoa powder, the viscosity of the mixture increases during stirring, leading to an insufficient extraction of the water-soluble portion from the cacao mass or cocoa powder. On the other hand, if the amount of hot water is in excess of about 10 times the weight of the cacao mass or cocoa powder, the extraction efficiency of the water-soluble portion increases, but the concentration of the water-soluble portion and the fine particle portion in the extract is low. This is not desirable since a large amount of heat energy and a lot of time are needed in the subsequent concentration. Furthermore, since concentration is carried out over a long period of time, aroma and flavor components are lost by steam distillation; the aroma and the flavor component contents undesirably decrease.

The fine particle portion which is transferred from the cacao mass or cocoa powder to hot water is a mixture of fine particles from the cacao mass or cocoa powder, specifically of such a size that a sandy feel is not produced when eaten and, more specifically, having a grain size of about $25\mu$ or less.

A mixture of the cacao mass or cocoa powder and hot water is stirred in, for example, a colloid mill, a mixer for production of mayonnaise, and a high-pressure homogenizer, until a colloid form is produced, whereupon the water-soluble portion and the fine particle portion are extracted from the cacao mass or cocoa powder.

The thus-agitated mixture is then separated into a mixture of the water-soluble portion and the fine particle portion, cacao butter, and an extraction residue using, e.g., a continuous centrifugal separator and a batch-type centrifugal separator. The centrifugal force used in this centrifugal separation operation is at least about 1,000 G. If the centrifugal force is less than about 1,000 G, insufficient separation of the cacao butter from the cacao mass or cocoa powder results and only cacao butter having a high water content is obtained. Furthermore, coarse particles having a grain size of $25\mu$ or more are present in the water-soluble portion and the fine particle portion.

The solids content of the water-soluble portion and the fine particle portion is about 3 to 10% by weight. Thus, concentration under reduced pressure at a temperature of about 70° C. or lower is achieved to increase the solids content to from 30 to 50% by weight. If the concentration process is carried out at temperatures exceeding about 70° C., the aroma and the flavor are degraded and the ultimate products are not delicious. If the solids content is not increased to the above-described range, the yield in the subsequent drying step decreases and more than a necessary drying time is needed, resulting in energy loss.

For the drying operation, any suitable technique such as spray drying and format drying can be employed. Freeze drying is preferred.

The cacao butter obtained by centrifugal separation as described above has a water content of from about 0.5 to about 10% by weight. Thus, the cacao butter is dehydrated by, for example, using a super centrifugal separator, or boiling, whereupon cacao butter having a water content of about 0.1% by weight is obtained. If the water content is in excess of about 0.1% by weight, when cacao butter having such a high water content is added during the production of a chocolate raw material, the viscosity of the entire molten chocolate raw material increases and thus the molten chocolate raw material becomes difficult to mold in the subsequent molding step.

When ethanol is added in an amount of from about 0.2 to about 20% by weight based on the weight of the cacao mass or cocoa powder during mixing and stirring the cacao mass or cocoa powder with hot water, the water-soluble portion is very easily transferred from the cacao mass or cocoa powder to hot water. Furthermore, the addition of ethanol produces a defoaming effect during the mixing and stirring process. Furthermore, the ethanol causes a clear boundary between layers at the time of centrifugal separation to be formed. If, however, the amount of ethanol added is less than about 0.2% by weight, the above-described effects cannot be obtained. On the other hand, if the amount of ethanol is in excess of about 20% by weight, the ultimate product, a cocoa drink, has reduced body and is not delicious.

Using 1 g of the ultimate product obtained by concentrating the water-soluble portion and the fine particle portion followed by drying, 100 ml of a cocoa drink can be prepared. This cocoa drink does not have a sandy feel at all, and when the cocoa drink is dissolved in milk, no precipitation occurs. With conventional cocoa drinks, 100 ml of cocoa drink can be prepared using 3 to 4 g of pure cocoa. This cocoa drink has a sandy feel and, when poured into milk, precipitation occurs.

The cacao butter produced by the present invention does not have the so-called "alkali" odor and, therefore, can be added as such or without application of any treatment in the production of chocolate.

The yield of a mixture of the water-soluble portion and fine particle portion ranges from about 20 to 25% by weight based on the weight of the cacao mass, and the yield of the cacao butter ranges from about 95 to 100% by weight with the amount of the cacao butter present in the cocoa powder as 100% by weight. In accordance with conventional methods, the yield is at most about 80% by weight. Furthermore, the process of the present invention produces the advantage that the extraction of the water-soluble portion and fine particle portion, and the cacao butter, from the cacao mass or cocoa powder can be carried out in the same process.

The water-soluble portion and fine particle portion soluble in hot water can be extracted from the cacao mass while at the same time treating the cacao mass with an alkali. In accordance with this procedure, an alkali, such as a carbonate, a hydrogen carbonate, or a hydroxide or ammonia, magnesium, sodium or potassium, is added to and dissolved in hot water maintained at a temperature of from 70° to 130° C. in an amount such that the amount of the alkali added is about 1 to about 2% by weight based on the weight of the cacao mass. The resulting solution is then added to the cacao mass in an amount of from 3 to 10 times by weight based on the weight of the cacao mass. The mixture is stirred to transfer the water-soluble portion and the fine particle portion from the cacao mass to the hot water and simultaneously to extract the cacao butter.

If the amount of the alkali added is less than about 1% by weight, the reaction with the cacao mass and the alkali proceeds only insufficiently and the yield of the water-soluble portion is low. On the other hand, if the amount of alkali is in excess of about 2% by weight, unreacted alkali remains and is transferred to the water-soluble portion extracted from the cacao mass. Thus, the water-soluble portion undesirably has an alkali odor.

The amount of hot water added and the temperature range of the hot water are determined for the same reasons as described above. Similarly the reason why ethanol is added and the amount of the ethanol added are determined for the same reasons as described above.

Thereafter a mixture of the alkali, the cacao mass and the hot water is placed in the same apparatus as described above and stirred to convert the mixture into a colloidal form, whereby the cacao mass is treated with the alkali and simultaneously the water-soluble portion and fine particle portion are extracted from the cacao mass.

The above-obtained solution is a colloidal form is placed in a centrifugal separator as described above where it is separated into an extract of the cacao mass, the water-soluble portion and the fine particle portion, an oil, and a residue. Suitable conditions for the centrifugal operation and the reasons therefor are as described above.

Thereafter the same treatment for the cacao mass or cocoa powder subjected to an alkali treatment is applied. The yield of the water-soluble portion and the fine particle portion, and the yield of the cacao butter are similar to those obtained in the case as described above. Cocoa drinks prepared using the ultimate product obtained by drying the water-soluble portion and the fine particle portion are more delicious than drinks prepared using pure cocoa. The cacao butter does not have an alkali odor and thus can be added as such or without application of any treatment in the production of chocolate.

The present invention is described in greater detail with reference to the following examples. Unless otherwise indicated, all parts, percents, ratios and the like are by weight.

EXAMPLE 1

Cacao beans were shelled and roughly cracked to produce cacao nibs. Potassium carbonate and water were added to the cacao nibs in amounts of 1.6% by weight and 25% by weight, respectively, based on the weight of the cacao nibs. They were mixed and stirred at 90° C. for 1 hour. The thus alkali treated cacao nibs were roasted and ground to yield cacao mass with a pH of 7.0. A mixture of 100 kg of the cacao mass obtained above and 500 kg of hot water maintained at 70° C. was placed in a colloid mill and stirred while maintaining the temperature at 70° C.

The resulting mixture was introduced into a continuous solid-liquid separation apparatus where the mixture was continuously separated at a centrifugal force of 2,500 G into 380 kg of a mixture of a water-soluble portion and a fine particle portion, 60 kg of cacao butter, and 160 kg of an extraction residue. The water-soluble portion/fine particle portion mixture was concentrated at a temperature of 70° C. at a pressure of 180 Torr to yield a concentrated material with a solids content of 50% by weight. This concentrated material was then freeze dried at 0.3 Torr and ground to obtain a final product with a water content of 1.5% by weight. The yield of the final product was 21% by weight based on the weight of the cacao mass.

The above-obtained cacao butter was passed through a super centrifugal separator to decrease the water content from 3% by weight to 0.1% by weight, whereupon a cacao butter having the same water content as used normally in the production of chocolate was obtained.

EXAMPLE 2

Cacao beans were roasted, shelled, and coarsely cracked to produce cacao nibs. Sodium carbonate and water were added to the cacao nibs in amounts of 2.1% by weight and 25% by weight, respectively, based on the weight of the cacao nibs. They were mixed and stirred at 90° C. for 1 hour. Ths thus alkali treated cacao nibs were dried and then ground to yield cacao mass with a pH of 7.5. Then, 10 kg of the cacao mass was placed in a pressure vessel equipped with a high-speed stirring blade, and 50 kg of hot water maintained at 120° C. was added thereto. The resulting mixture was stirred and converted into a colloidal form. The mixture was then introduced into a batch-type centrifugal separator where it was separated at a centrifugal force of 1,000 G into 39.3 kg of a mixture of a water-soluble portion and a fine particle portion, 5.5 kg of cacao butter, and 15.2 kg of an extraction residue. The water-soluble portion/fine particle portion mixture was concentrated at a temperature of 80° C. at a pressure of 230 Torr to yield a concentrated material with a solids content of 40% by weight. The concentrated material was spray dried in hot air maintained at 100° C. to obtain a final product with a water content of 2.0% by weight. The yield of the final product was 18% by weight based on the weight of the cacao mass.

The above-obtained cacao butter was passed through a super centrifugal separator to decrease the water content from 5% by weight to 0.1% by weight. This water content is nearly equal to that of conventional commercially available cacao butter.

EXAMPLE 3

Cacao beans were shelled and coarsely cracked to produce cacao nibs. Potassium hydrogencarbonate and water were added to the cacao nibs in amounts of 2.5% by weight and 30% by weight, respectively, based on the weight of the cacao nibs. The cacao nibs were alkali-treated at 90° C. for 1 hour, and then roasted and ground to produce cacao mass. This cacao mass was squeezed, yielding a cocoa cake with cacao butter content of 22% by weight. This cocoa cake was ground to produce cocoa powder.

2 kg of ethyl alcohol of food additive grade was added to a mixture of 600 kg of hot water and 100 kg of the above-obtained cocoa powder at a temperature of 80° C. while stirring. The resulting mixture was converted into a colloidal form using a high-pressure homogenizer and then introduced into a basket-type centrifugal separator where the mixture was separated at a centrifugal force of 3,200 G. A fraction containing a water-soluble portion, a fine particle portion, and cacao butter was again subjected to centrifugal separation successively, whereupon a water-soluble portion/fine particle portion mixture was separated from the cocoa butter. The water-soluble portion/fine particle portion mixture was powdered in the same manner as described in Example 1 to yield a final product with a water content of 2.5% by weight. The cacao butter was also treated in the same manner as in Example 1, and the thus-treated cacao butter had the same water content as in Example 1. The yields of the final product and the cacao butter based on cacao mass were the same as in Example 1.

EXAMPLE 4

Hot water (500 kg) with 2.0 kg of potassium carbonate dissolved therein and maintained at 90° C. was added to 100 kg of cacao mass, and uniformly mixed and stirred for 1 hour in a colloid mill. The mixture was then placed in a continuous solid/liquid separator where it was separated at a centrifugal force of 2,660 G while maintaining the temperature at 90° C., yielding 420 kg of a water-soluble portion/fine particle portion mixture, 60 kg of cacao butter, and 120 kg of an extraction residue. This water-soluble portion/fine particle portion mixture was dried and powdered in the same manner as described in Example 1. The water content of the final product was 2.5% by weight.

The cacao butter was boiled. The thus-boiled cacao butter had a water content of 0.1% by weight. The yield of the solid fraction (water-soluble portion and fine particle portion) was 25.0% by weight based on cacao mass. The recovery of cacao butter was 99.0% by weight based on cacao butter including the total weight of the water-soluble portion/fine particle portion mixture and the cacao butter portion.

TEST EXAMPLE 1

The cumulative particle size distributions of the final product obtained in Example 1 and the usual pure cocoa having an oil content of 22% by weight are shown in the FIGURE. In the drawing, the broken line indicates the usual pure cocoa, and the solid line indicates the product of the present invention.

Each sample was dissolved in hot water to prepare a 4% by weight aqueous solution. The product of the present invention was compared with the usual pure cocoa by a panel of 30 specialists. The panel concluded that the product of the present invention did not have a sandy feel. With regard to the usual pure cocoa, however, 25 people concluded that this cocoa provided a sandy feel and was not acceptable for practical use in view of its taste, and 5 people concluded that it had a sandy feel, but was acceptable.

TEST EXAMPLE 2

The flavor concentration of each of the final products obtained in Example 1 and the usual pure cocoa was examined at four levels as shown in Table 1 below by a panel of 30 specialists. The results obtained are shown in Table 2 below.

TABLE 1

| Sample | Product of the Present Invention (% by weight) | Commercially Available Pure Cocoa (% by weight) |
| --- | --- | --- |
| A | 1 | 2 |
| B | 1 | 3 |
| C | 1 | 4 |
| D | 1 | 5 |

TABLE 2

| Sample | *1 | *2 |
| --- | --- | --- |
| A | 30 | 0 |
| B | 20 | 10 |
| C | 16 | 14 |
| D | 23 | 17 |

Note:
*1 Number of people stating that the product of the present invention had a higher flavor concentration.
*2 Number of people not stating that the product of the present invention had a higher flavor concentration.

It can be seen from the results in Table 2 that a 1% by weight solution of the product of the present invention is nearly equivalent to a 4% by weight solution of commercially available pure cocoa.

Cocoa drinks containing 1% by weight of the product of the present invention or 4% by weight of commercially available pure cocoa were prepared and compared by a panel of specialists. That is, a drink prepared by dissolving 1 g of the powdered product of the present invention and 10 g of sugar in 100 ml of hot water, and a drink prepared by dissolving 4 g of commercially available pure cocoa and 10 g of sugar in a 100 ml of hot water were compared by the panel. Twenty three people of the panel preferred the drink prepared using the product of the present invention to the other drink prepared using commercially available pure cocoa. On the other hand, seven people preferred the other drink prepared using commercially available pure cocoa.

Thus, the product of the present invention was preferred significantly.

TEST EXAMPLE 3

A milk chocolate consisting of 15% by weight of cacao mass, 40.5% by weight of sugar, 20% by weight of powdered milk, 24% by weight of commercially available deodored cacao butter, and 0.5% by weight of lecithin was made by the usual method. Similarly, a milk chocolate having the same formulation as above except that commercially available deodored cacao butter was replaced by the cacao butter obtained in Example 2 was prepared by the usual method. These milk chocolates were compared by a panel of specialists. The panel concluded that the milk chocolates were preferred equally and could not be distinguished at all.

While the invention has been described in detail and with reference to specific embodiments thereof, it will be apparent to one skilled in the art that various changes and modifications can be made therein without departing from the spirit and scope thereof.

What is claimed is:

1. A process for producing cocoa powder comprising:
   (1) uniformly mixing (a) alkali-treated cacao mass having a pH of about 6.0 to about 8.5 or (b) alkali-treated cocoa powder having a pH of about 6.0 to about 8.5, with (c) about 3 to about 10 times by weight of hot water based on the weight of the cacao mass or cocoa powder, in the absence of (d) ethanol,
   (2) maintaining the resulting mixture of step (1) at a temperature of 70° to 130° C. for about 1 hour to dissolve a water-soluble portion of the cocoa mass or cocoa powder;
   (3) separating the dissolved water-soluble portion from the resulting mixture of step (2); and
   (4) drying the resulting dissolved water-soluble portion of step (3) to obtain said cocoa powder.

2. The process as claimed in claim 1, wherein the alkali is a carbonate, a hydrogen carbonate or a hydroxide of ammonia, magnesium, sodium or potassium.

3. The process as claimed in claim 1, wherein said step (1) is carried out at 90° C. for one hour.

4. The process as claimed in claim 1, wherein step (3) is carried out by centrifugal separation with a centrifugal force of at least about 1,000 G.

5. A process for producing cocoa powder comprising:
   (1) uniformly mixing (a) cacao mass with (b) about 3 to about 10 times by weight of hot water based on the weight of the cocoa mass, wherein said hot water contains an alkali in an amount of about 1 to 2% by weight of the cocoa mass in the absence of (c) ethanol,
   (2) maintaining the resulting mixture of step (1) at a temperature of 70° to 130° C. for about 1 hour to dissolve a water-soluble portion of the cocoa mass while simultaneously treating the cocoa mass with the alkali;
   (3) separating the dissolved water-soluble portion from the resulting mixture of step (2); and
   (4) drying the resulting dissolved water-soluble portion of step (3) to obtain said cocoa powder.

6. The process as claimed in claim 5, wherein the alkali is a carbonate, a hydrogen carbonate or a hydroxide of ammonia, magnesium, sodium or potassium.

7. The process as claimed in claim 5, wherein step (3) is carried out by centrifugal separation with a centrifugal force of at least about 1,000 G.

* * * * *